United States Patent [19]
Hunt

[11] 4,093,853
[45] June 6, 1978

[54] ROTATIONAL SPEED TRANSDUCERS

[75] Inventor: Norman Hunt, Leamington Spa, England

[73] Assignee: Associated Engineering Limited, Leamington Spa, England

[21] Appl. No.: 770,363

[22] Filed: Feb. 22, 1977

[30] Foreign Application Priority Data

Mar. 5, 1976 United Kingdom ............... 9035/76

[51] Int. Cl.² ........................................... G01D 5/34
[52] U.S. Cl. ............................. 250/231 SE; 324/175
[58] Field of Search ............... 250/231 GY, 231 SE, 250/237 G; 324/175; 356/169, 170

[56] References Cited

U.S. PATENT DOCUMENTS

| 3,231,807 | 1/1966 | Willis | 324/175 |
| 3,811,056 | 5/1974 | Baba et al. | 324/175 X |
| 3,846,701 | 11/1974 | Sampey | 324/175 |
| 3,942,112 | 3/1976 | Westbrook | 324/175 X |

FOREIGN PATENT DOCUMENTS

| 2,245,950 | 4/1975 | France | 324/175 |
| 1,097,528 | 1/1968 | United Kingdom | 324/175 |

Primary Examiner—James B. Mullins
Attorney, Agent, or Firm—Brisebois & Kruger

[57] ABSTRACT

A rotational speed transducer comprises a member which is mounted to rotate at a speed related to a rotational speed input. A lamp and a photocell are mounted in relation to the rotatable member such that light from the lamp is only reflected by the rotatable member toward the photocell each time a reflector portion or portions of the rotatable member comes into a particular position or positions with respect to the lamp so as to provide an electrical output, from the photocell, which is a measure of the rotational speed input. The reflector portions may be portions of a disc which constitutes the rotatable member.

2 Claims, 6 Drawing Figures

ROTATIONAL SPEED TRANSDUCERS

BACKGROUND OF THE INVENTION

This invention relates to rotational speed transducers, that is to say to devices giving an electrical output which is a measure of a rotational speed input. The output may be directly dependent on the rotational speed or, for example, on a multiple of the rotational speed.

SUMMARY OF THE INVENTION

According to the present invention, a rotational speed transducer comprises rotatable means mounted to rotate at a speed related to a rotational speed input, in combination with lamp means and photocell means which are mounted in relation to said rotatable means such that light from said lamp means is only reflected by said rotatable means toward said photocell means each time a reflector portion or portions of said rotatable means comes into a given relation with said lamp means, thereby to provide an electricl output, from said photocell means, which is a measure of the rotational speed input.

Preferably the lamp means and the photocell means are mounted side-by-side, and the rotatable means has reflector portions mounted at an angle to its axis of rotation and spaced apart so as to reflect light emitted by the lamp means from one said reflector portion to another said reflector portion, and from the latter portion to the photocell means.

In one construction, said reflector portions are mounted at 45° to the axis of rotation, and the lamp means and the photocell means have their optical axes parallel to one another and to the axis of rotation. Preferably the rotatable means is a disc mounted on a shaft, with reflector portions at the periphery of the disc inclined to the plane of the disc.

BRIEF DESCRIPTION OF THE DRAWINGS

The invention will now be further described, by way of example, with reference to the accompanying drawings, in which.

DESCRIPTION OF THE PREFERRED EMBODIMENT

Figure 1:
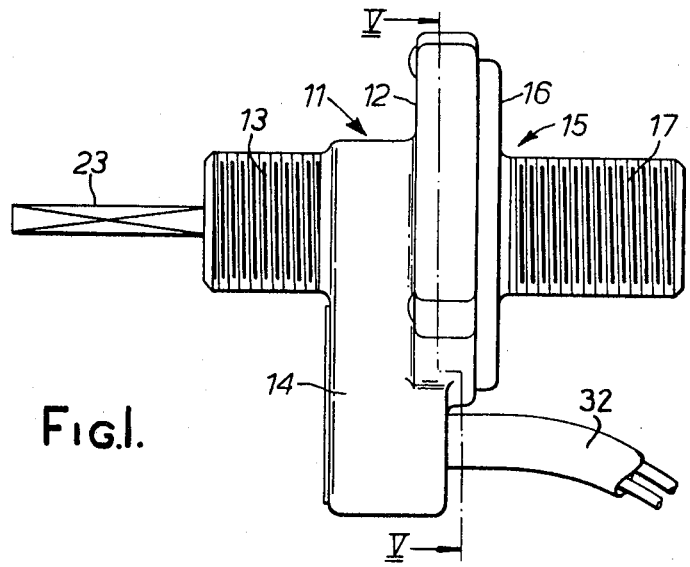
FIG. 1 is a side elevation of one embodiment of a rotational speed transducer.
Figure 2:
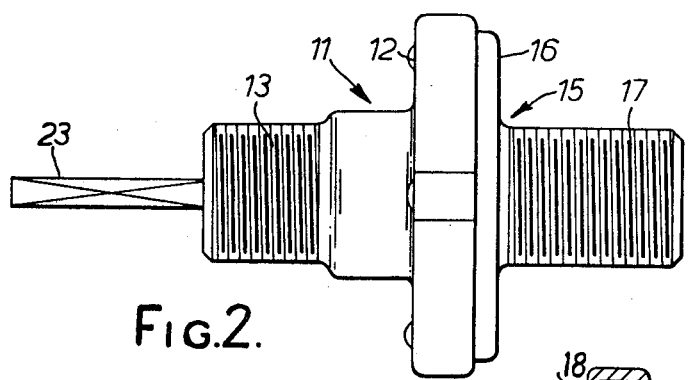
FIG. 2 is a plan view of the transducer of FIG. 1.
Figure 6:
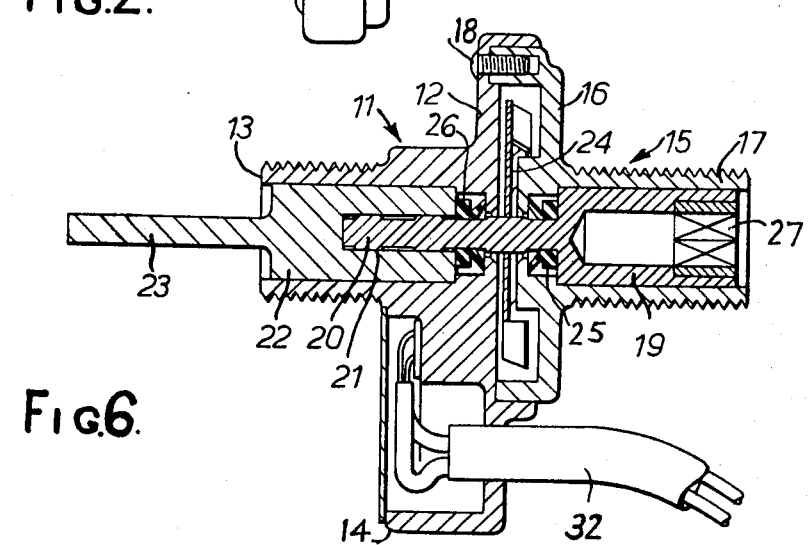
FIG. 6 is a longitudinal section of the transducer.
Figure 3:
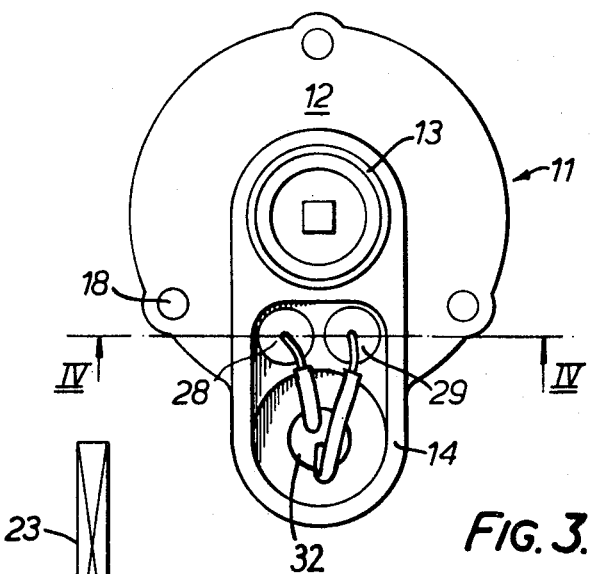
FIG. 3 is an end elevation of the transducer, with part removed away.
Figure 4:
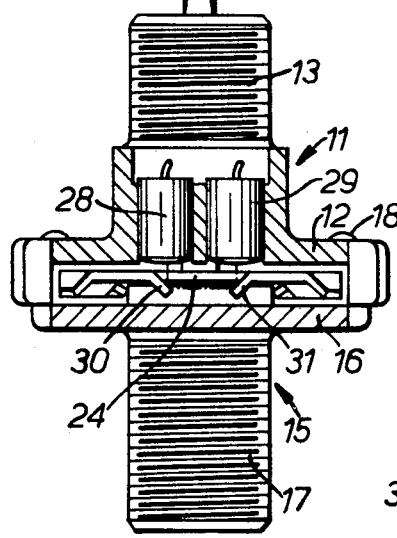
FIG. 4 is a cross-section on the IV—IV of FIG. 3.
Figure 5:
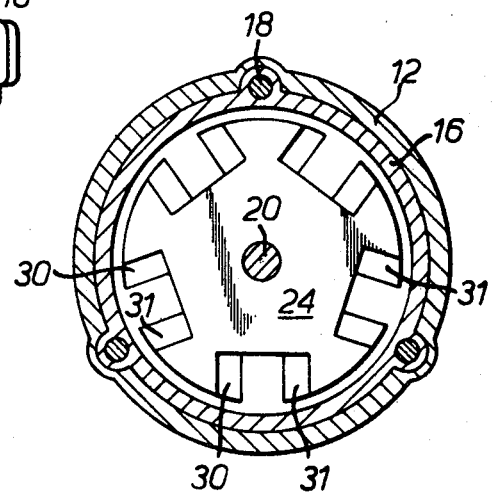
FIG. 5 is a section on the line V—V of FIG. 1.

Referring to the drawings, the rotational speed transducer has a two-part casing, of which one part 11 includes a circular flanged disc-like part 12, a projecting hollow boss 13 coaxial with the disc-like part 12, and a housing portion 14 extending laterally from the boss 13. The other part 15 of the casing includes a circular flanged disc-like part 16, the flange of which fits within the flange of the part 12, and a hollow boss 17. The two flanged disc-like parts 12, 16 are secured together at their periphery by three rivets 18.

A hollow shaft 19 rotates within the boss 17, and has a portion 20 projecting from its inner end which is a locking press fit in a bore 21 in a shaft 22. The latter shaft rotates within the boss 13 and has a squared drive shaft portion 23 projecting from the end of boss 13. Secured to the shaft portion 20 is a disc 24, which lies between the parts 12, 16 of the casing, so as to rotate with rotation of the shafts. The shafts 19 and 22 are located axially of the casing by the shoulders at the inner ends of the shafts engaging corresponding abutments within the bosses 17 and 13. Seals 25, 26 may be provided respectively between the shoulder of shaft 19 and disc-like part 16, and between the shoulder of the shaft 22 and the disc-like part 12. The shaft 19 has a squared bore 27, to receive a square-section driving shaft.

The housing portion 14 contains a lamp 28 and a photocell 29 arranged side-by-side at the same radial distance from the axis of rotation of the shafts and with their optical axes parallel to one another and to the axis of rotation of the shaft. The disc 24 has five sets of reflector portions 30, 31 inclined at 45° to its plane and which are arranged in pairs symmetrically about five equally-spaced radial lines, such that the reflector portions are at the same radius from the axis of rotation as the lamp 28 and photocell 29. In operation, the lamp 28 is arranged to be continuously supplied with current, so as, to be always lit. Thus, it will be seen that as the shaft 19 and disc 24 rotate, light from the lamp 28 will be reflected through a right-angle by one portion 30 of each pair of reflector portions to the other portion 31 of the same pair, which will reflect the light through a further right-angle to the photocell 29. Thus, the photocell 29 will be energised five times during each revolution of the disc. These pulses are fed to an appropriate circuit by electric wiring 32.

It will be evident that variations may be made within the scope of the invention; for example, the number of pairs of reflector portions may be greater or less than five. The bosses 13, 17 may be externally screw-threaded, as shown, so as to be inserted either between a speedometer drive and cable, or between the speedometer cable and the speedometer, with the squared parts 23, 27 respectively driving and being driven by the moving part of the speedometer drive.

In this specification the term "light" includes not only visible light but also other forms of radiation which may be reflected, for example infra-red light, and the terms "lamp means" and "photocell means" therefore include devices emitting and sensitive to such radiation.

What is claimed is:

1. A rotational speed transducer comprising:
rotatable means;
means mounting said rotatable means such that it can rotate at a speed related to a rotational speed input;
said rotatable means having a plurality of light reflector portions;
means mounting said plurality of reflector portions at an angle to the axis of rotation of said rotatable means;
lamp means for emitting light;
photocell means for receiving light from said lamp means and providing an electrical output in response thereto;
and means mounting said lamp means and said photocell means in relation to said rotatable means whereby to reflect light emitted by said lamp means from a first reflector portion to a second reflector portion and from said latter portion to said photocell means each time said first reflector portion comes into a given relation with said lamp means, as said rotatable means rotates, thereby to provide from said photocell means an electrical output which is a measure of the rotational speed input.

2. A transducer as claimed in claim 1, wherein said reflector portions are mounted at substantially 45° to said axis of rotation of said rotatable means, and said lamp means and photocell means have their optical axes substantially parallel to one another and to said axis of rotation.

* * * * *